United States Patent
Gangwal et al.

(10) Patent No.: US 11,612,812 B1
(45) Date of Patent: Mar. 28, 2023

(54) VIDEO GAME STREAMING WITH DYNAMIC RANGE CONVERSION

(71) Applicant: Amazon Technologies, Inc., Seattle, WA (US)

(72) Inventors: Om Prakash Gangwal, Fremont, CA (US); Ross Alan Cameron Gardner, Irvine, CA (US); Daniel Campanile, Menifee, CA (US); Alexander Tyler, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/362,087

(22) Filed: Jun. 29, 2021

(51) Int. Cl.
| | |
|---|---|
| *A63F 13/355* | (2014.01) |
| *A63F 13/86* | (2014.01) |
| *H04N 7/01* | (2006.01) |
| *H04N 21/2187* | (2011.01) |
| *H04N 21/478* | (2011.01) |
| *H04N 5/232* | (2006.01) |

(52) U.S. Cl.
CPC ............ *A63F 13/355* (2014.09); *A63F 13/86* (2014.09); *H04N 5/23299* (2018.08); *H04N 7/0125* (2013.01); *H04N 21/2187* (2013.01); *H04N 21/4781* (2013.01); *A63F 2300/572* (2013.01)

(58) Field of Classification Search
CPC .............................. A63F 13/355; A63F 13/86
See application file for complete search history.

(56) References Cited

U.S. PATENT DOCUMENTS

| | | | |
|---|---|---|---|
| 11,130,056 B2 | 9/2021 | Bansi et al. | |
| 11,290,747 B2 | 3/2022 | Koo et al. | |
| 2015/0243200 A1 | 8/2015 | Pan | |
| 2016/0346689 A1 | 12/2016 | Vukojevic et al. | |
| 2016/0358584 A1 | 12/2016 | Greenebaum et al. | |
| 2016/0381398 A1 | 12/2016 | Saxena et al. | |
| 2017/0070735 A1* | 3/2017 | Ramasubramonian | H04N 19/124 |
| 2017/0104973 A1* | 4/2017 | Toma | H04N 7/0125 |
| 2017/0282075 A1* | 10/2017 | Michot | A63F 13/86 |
| 2017/0311034 A1* | 10/2017 | Nishi | G06T 5/009 |
| 2018/0152684 A1 | 5/2018 | Wozniak et al. | |
| 2018/0152686 A1 | 5/2018 | Wozniak et al. | |
| 2018/0302663 A1 | 10/2018 | Yoshizawa et al. | |
| 2019/0082138 A1* | 3/2019 | Pan | G06F 17/10 |
| 2019/0082186 A1 | 3/2019 | Van Der Vleuten | |

(Continued)

*Primary Examiner* — Seng H Lim
(74) *Attorney, Agent, or Firm* — BakerHostetler

(57) ABSTRACT

Conversion components may receive game video rendered in high-dynamic-range (HDR) and standard-dynamic-range (SDR) camera video of a game player. The conversion components may provide local video output to a local display and remote video output for network transmission to remote viewers. The SDR camera video may be converted to HDR and provided with HDR game video in the local video output. For HDR network transmission, the HDR game video and converted HDR camera video may be included in the remote video output. For SDR network transmission, the HDR game video may be converted to SDR and provided with the SDR camera video in the remote video output. The game video, camera video and other video feeds may have respective portals in the local and remote video outputs. The local and remote video outputs may have respective visual portal arrangements that may be at least partially different from one another.

16 Claims, 13 Drawing Sheets

(56) References Cited

U.S. PATENT DOCUMENTS

| | | |
|---|---|---|
| 2019/0089956 A1 | 3/2019 | Stessen |
| 2019/0118098 A1 | 4/2019 | Payzer et al. |
| 2019/0118099 A1 | 4/2019 | Payzer et al. |
| 2019/0253637 A1* | 8/2019 | Savoie ............... H04N 21/4223 |
| 2019/0268653 A1* | 8/2019 | Wakazono ............. H04N 5/232 |
| 2020/0288082 A1* | 9/2020 | Matsuda ................ H04N 5/268 |
| 2020/0394775 A1 | 12/2020 | Andrivon et al. |
| 2021/0101083 A1 | 4/2021 | Payzer et al. |
| 2021/0185390 A1* | 6/2021 | Nishi ........................ G09G 5/10 |
| 2021/0354032 A1 | 11/2021 | Bansi et al. |
| 2021/0409796 A1* | 12/2021 | McGilvray ........ H04N 21/2665 |
| 2022/0078386 A1* | 3/2022 | Zink ........................ H04N 9/67 |
| 2022/0180635 A1* | 6/2022 | Zandifar ................ G06V 20/46 |
| 2022/0212100 A1* | 7/2022 | Mosier ................... H04N 19/40 |

\* cited by examiner

VIDEO GAME STREAMING WITH DYNAMIC RANGE CONVERSION

CROSS-REFERENCE TO RELATED APPLICATIONS

This application is related to the following application, which is hereby incorporated by reference in its entirety: U.S. patent application Ser. No. 17/361,938 filed Jun. 29, 2021, entitled "VIDEO GAME STREAMING WITH DYNAMIC RANGE CONVERSION". This application is also related to the following application, which is also hereby incorporated by reference in its entirety: U.S. patent application Ser. No. 17/361,856 filed Jun. 29, 2021, entitled "VIDEO GAME STREAMING WITH DYNAMIC RANGE CONVERSION".

BACKGROUND

Over the past few years, playing of video games has become an increasingly social experience. Video streaming services may allow game players to transmit video of themselves playing a video game to large quantities of remote viewers. The transmitted video may often include game video, which is rendered by the video game itself, as well as camera (e.g., webcam) video that shows the game player playing, and commentating on, the video game. High-dynamic-range (HDR) is an image and video technology that may improve color representations and visual details, such as compared to standard-dynamic-range (SDR) technology. One limitation of at least some existing video game streaming configurations is that they may not allow streaming of HDR video games. This may cause frustration among some game players and viewers that wish to play and view HDR video games.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
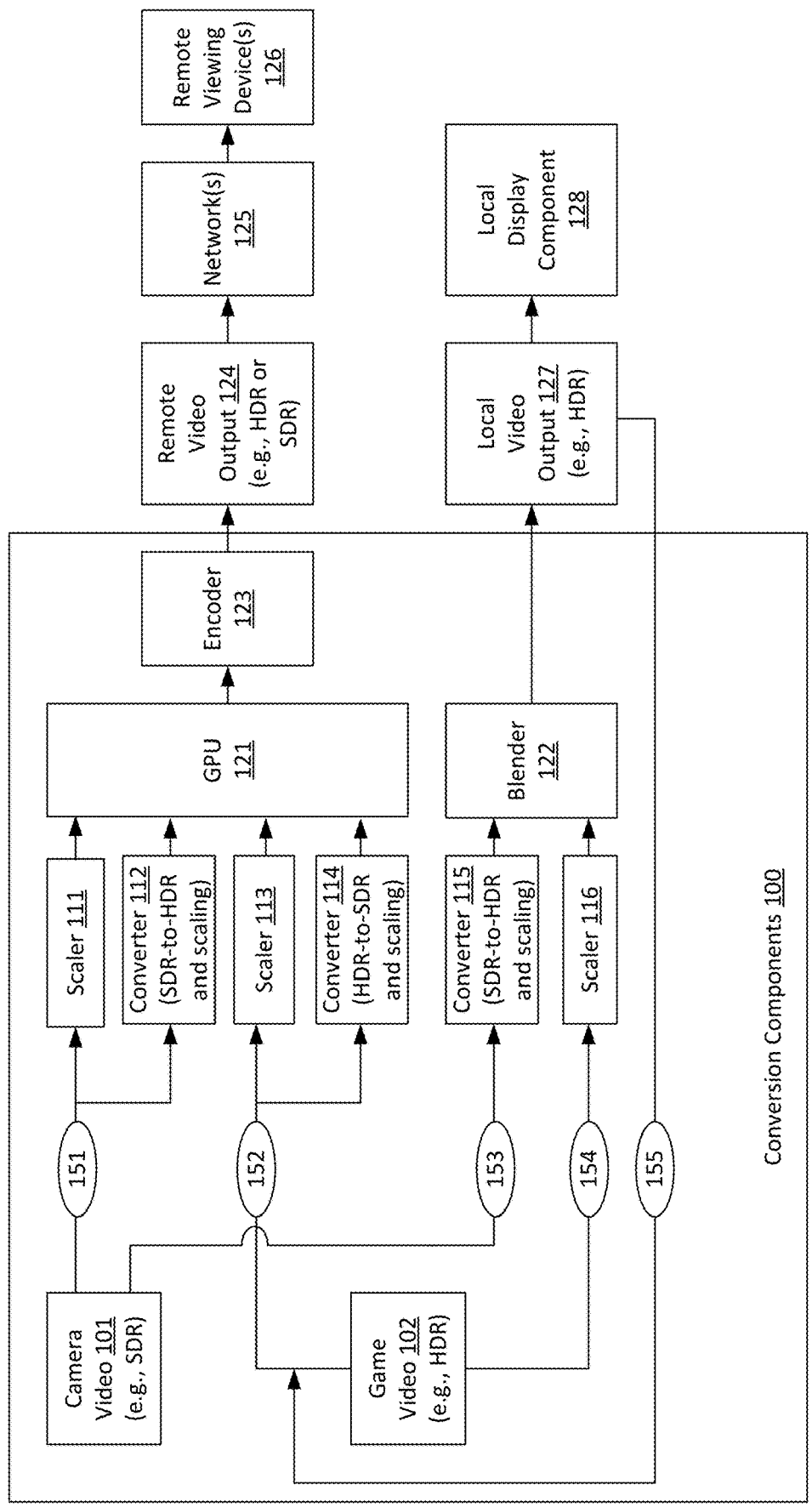
FIG. 1 is a diagram illustrating an example video conversion system that may be used in accordance with the present disclosure.

Techniques for video game streaming with dynamic range conversion and selectable portal arrangement are described herein. In some examples, conversion components may be provided that may allow conversion of high-dynamic range (HDR) and/or standard-dynamic range (SDR) video inputs to HDR and/or SDR video outputs. The video inputs may include game video received from a video game as well as camera (e.g., webcam) video received from one or more cameras. The term game video, as used herein, refers to video that is rendered by a video game. The camera video may include video that shows a game player playing, and commentating on, the video game. The video outputs may include a local video output, which is provided to a local display component (e.g., television), such as for display to the video game player as he or she plays the video game. The video outputs may also include a remote video output, which is transmitted over one or more networks, such as to one or more remote viewers (e.g., via a video streaming service).

In some examples, the game video may be received, by the conversion components, from a game console. In some other examples, the game video may be server-rendered game video that may be received from a remote server, such as a cloud-gaming server. In some examples, the conversion components may be integrated into a display device (e.g., a smart television) that includes the local display component. In some other examples, the conversion components may be included in an intermediary device, which is external to the display device that includes the local display component. In some cases, the intermediary device may include one or more High-Definition Multimedia Interface (HDMI)™ or other digital video input ports, for example to receive video input from game consoles, cameras and/or other devices. Additionally, the intermediary device may include one or more HDMI™ or other digital video output ports, for example to provide video to a display device and/or other devices. The intermediary device may also include one or more wired and/or wireless network connections, such as to send and receive data to and from the Internet and other networks. In one specific example, the intermediary device may perform other television-related functionality, such as allowing downloading and executing of applications for watching movies, television programs, playing music, online shopping, and the like. These and other configurations of the conversion components may assist in allowing a video game player to play games and transit game video from a convenient location, such as a living room sofa, family room couch or other convenient television location, for example without the need to employ a traditional laptop or desktop computer.

In some examples, the game video that is input to the conversion components may be HDR video. By contrast, in some examples, the camera (e.g., webcam) video that is input to the conversion components may be SDR video. Moreover, in some examples, the conversion components may provide HDR local video outputs for display on an HDR-supported local display component that is configured to display HDR video. In these and other examples, the conversion components may include an SDR-to-HDR converter that converts the input SDR camera video to HDR camera video for display on the HDR-supported local display component.

The conversion components may provide one or more user interfaces (e.g., that are displayed via the local display component) that allow the user (e.g., the video game player) to configure options for streaming. For example, a conversion component user interface may allow a user to select whether the remote video output is to be streamed as HDR or SDR video. For scenarios in which HDR streaming is selected, the input SDR camera video may also be converted to HDR camera video for network streaming. By contrast, for scenarios in which SDR streaming is selected, the conversion components may convert (via an HDR-to-SDR converter) the input HDR game video to SDR game video for network streaming. The conversion components may also include resolution scaling components to scale (if necessary) resolution levels of the video inputs to appropriate resolution levels for local display as well as network transmission.

In some examples, the conversion components may include a separate processing component, such as a graphics processing unit (GPU), for processing of the remote video output independently of the local video output This may allow the remote video output to be arranged differently than the local video output. For example, this may allow the remote video output to include video feeds that are not included in the local video output. As an example, in some cases, the camera input may be included in the remote video output but not in the local video output. Additionally, in some examples, the local video output may include video feeds that are not included in the remote video output. For example, in some cases, an additional video input, such as a chat interface that displays chat messages associated with the video game, may be included in the local video output but not in the remote video output. Furthermore, in some examples, a video feed may occupy a different display area in the remote video output than in the local video output. For example, a video feed may have a different size and/or shape (e.g., aspect ratio) in the remote video output than in the local video output. As a specific example, the camera video may be larger in the remote video output than in the local video output. As another specific example, the camera video may have a square shape in the remote video output but may have a non-square rectangular shape in the local video output. As yet another specific example, the camera video may be located on at the bottom-right corner of the remote video output but may be located at the top-left corner of the local video output.

One or more user interfaces provided by the conversion components may allow the user to configure the arrangements for the remote video output and the local video output. For example, the user interfaces may allow the user to select each video feed that is displayed in each of the remote and local video outputs as well as the respective size, shape (e.g., aspect ratio), and location of each video feed in each of the remote and local video outputs. The user interfaces may also allow the user to dynamically (e.g., during gameplay) modify any, or all, of the configurations and selections for the local video output and the remote video output. Moreover, the conversion components may also allow the user to provide instructions to temporarily connect the remote video output to the local display, thereby allowing the user to temporarily view, on the local display, the same output that is being seen by remote viewers. This may be helpful, such as to allow the user to temporarily see what his or her viewers are seeing. For example, the user may wish to confirm that the webcam feed in the remote video output is not blocking certain portions of the game video. Thus, the conversion components may allow the user to switch input to the local display between the local video output and the remote video output. Moreover, in some examples, the conversion components may allow the user to switch the remote video output between different cameras. In one specific example, for most of the game transmission, the player may transmit video from a side-view camera that is zoomed-out to show not only the player's face but also the player's body, such as to show hand gestures and other player actions. However, at certain times during gameplay, such as right after key events (e.g., winning a battle, scoring a touchdown, etc.), the player may wish to temporarily transmit video from a front-view camera that is zoomed-in on the player's face, such as to show facial expressions in response to these key game events. The conversion components may allow the game player to switch between these multiple cameras with different camera angles, zoom levels, etc.

FIG. 1 is a diagram illustrating an example video conversion system that may be used in accordance with the present disclosure. As shown in FIG. 1, conversion components 100 receive video inputs including game video 102 and camera (e.g., webcam) video 101. The game video 102 may be received from a video game that renders the game video 102. The camera video 101 may be captured by, and received from, a video camera. The camera video 101 may include video that shows a game player playing, and commentating on, the video game. In the example of FIG. 1, game video 102 is received, by the conversion components 100, from a video game that provides HDR video. Thus, game video 102 includes HDR video when the game video 102 is received by the conversion components 100. It is noted, however, that the techniques described herein are not limited to use with HDR video games and that SDR game video may also be employed. Additionally, in the example of FIG. 1, camera video 101 is received, by the conversion components 100, from an SDR camera. Thus, camera video 101 includes SDR video when the camera video 101 is received by the conversion components 100. It is noted, however, that the techniques described herein are not limited to use with SDR cameras and that HDR cameras may also be employed. In some examples, the conversion components 100 may receive multiple camera video feeds from multiple different cameras. Moreover, in some examples, the conversion components 100 may receive one or more camera video feeds from SDR cameras as well as one or more camera video feeds from HDR cameras.

As also shown in FIG. 1, conversion components 100 provide video outputs including local video output 127 and remote video output 124. As shown, local video output 127 is provided to a local display component 128 (e.g., television), such as for display to the video game player as he or she plays the video game. Additionally, the remote video output 124 is transmitted over one or more network(s) 125, such as to one or more remote viewing device(s) 126 (e.g., via a video streaming service). The remote video output 124 may be transmitted over one or more local area networks (LAN's) and/or one or more wide area networks (WAN's), such as the Internet. Additionally, the remote video output 124 may be transmitted using streaming transmission techniques, in which portions of transmitted content are received and played while subsequent portions of the transmitted content are being transmitted. In some examples, the remote video output 124 may be transmitted to, and played by, remote viewing device(s) 126 using live streaming techniques. The term live streaming, as used herein, refer to scenarios in which video content of an event (e.g., a video game) may be transmitted to viewers, and at least part of the video content may be played while the event is still occurring (e.g., while the video game is still being played by the players), albeit with some small amounts latency between the time that video content is captured and the time that the video is eventually played to viewers.

In the example of FIG. 1, both the local video output 127 and the remote video output 124 may optionally include the game video 102 and the camera video 101. Additionally, in the example of FIG. 1, the local video output 127 includes HDR video, and the local display component 128 is configured to display HDR video. It is noted, however, that the techniques described herein are not limited to use with HDR local display components and that SDR local display components may also be employed. Furthermore, in the example of FIG. 1, the remote video output 124 may include either HDR or SDR video. For example, in some cases, the conversion components 100 may provide one or more user interfaces that may be displayed via local display component 128 and that may allow a user (e.g., video game player) to select whether the remote video output 124 is to be streamed as HDR or SDR video. These user interfaces may also allow the user to select a desired image resolution for streaming.

As shown in FIG. 1, the game video 102, which is received by the conversion components 100 as HDR video, may be included in the remote video output 124 via path 152. Specifically, via path 152, the game video 102 is provided to either a scaler 113 or a converter 114, depending upon whether HDR streaming or SDR streaming is selected for remote video output 124. For scenarios in which SDR streaming is selected, it is necessary to convert the game video 102 from HDR video (as provided by the video game) to SDR video (for SDR streaming). Thus, when SDR streaming is selected, the game video 102 is provided, via path 152, to converter 114, which converts the game video 102 from HDR video to SDR video. Converter 114 may also optionally scale the resolution of game video 102, if necessary, to match a desired transmission resolution. For example, if the game video 102, as provided by the video game, has 4 k resolution, and the user selects 1080p resolution for remote video output 124, then the converter 114 may downscale the game video 102 from 4 k resolution to 1080p resolution. By contrast, for scenarios in which HDR streaming is selected, it is not necessary to convert the game video 102 from HDR video to SDR video. Thus, when HDR streaming is selected, the game video 102 is provided, via path 152, to scaler 113. Scaler 113 does not convert the game video 102 from HDR video to SDR video. However, scaler 113 may optionally scale the resolution of game video 102, if necessary, to match a desired transmission resolution as described above.

Additionally, the game video 102 may be included in the local video output 127 via path 154. As described above, in the example of FIG. 1, the local display component 128 is an HDR display. Thus, in the example of FIG. 1, it is not necessary to convert the game video 102 from HDR video to SDR video. Accordingly, the game video 102 is provided, via path 154, to scaler 116. Scaler 116 does not convert the game video 102 from HDR video to SDR video. However, scaler 116 may optionally scale the resolution of game video 102, if necessary, to match the display resolution of the local display component 128. In some examples, the display resolution of the local display component 128, as well as an indication of whether the local display component 128 supports HDR video, may also be entered, by the user, into one or more user interfaces provided by the conversion components 100.

As also shown in FIG. 1, the camera video 101, which is received by the conversion components 100 as SDR video, may be included in the remote video output 124 via path 151. Specifically, via path 151, the camera video 101 is provided to either a scaler 111 or a converter 112, depending upon whether HDR streaming or SDR streaming is selected for remote video output 124. For scenarios in which HDR streaming is selected, it is necessary to convert the camera video 101 from SDR video (as provided by an SDR camera) to HDR video (for HDR streaming). Thus, when HDR streaming is selected, the camera video 101 is provided, via path 151, to converter 112, which converts the camera video 101 from SDR video to HDR video. Converter 114 may also optionally scale the resolution of camera video 101, if necessary, to match a desired transmission resolution. By contrast, for scenarios in which SDR streaming is selected, it is not necessary to convert the camera video 101 from SDR video to HDR video. Thus, when SDR streaming is selected, the camera video 101 is provided, via path 151, to scaler 111. Scaler 111 does not convert the camera video 101 from SDR video to HDR video. However, scaler 111 may optionally scale the resolution of camera video 101, if necessary, to match a desired transmission resolution.

Additionally, the camera video 101 may be included in the local video output 127 via path 153. As described above, in the example of FIG. 1, the local display component 128 is an HDR display. Thus, in the example of FIG. 1, it is necessary to convert the camera video 101 from SDR video to HDR video. Accordingly, the camera video 101 is provided, via path 153, to converter 115. Converter 115 converts the camera video 101 from SDR video to HDR video. Additionally, converter 115 may optionally scale the resolution of camera video 101, if necessary, to match the display resolution of the local display component 128. It is noted that a person of ordinary skill in the art will appreciate that there are multiple SDR to HDR and HDR to SDR conversion techniques that may be employed by converters 112, 114 and/or 115, as applicable.

The conversion components 100 include a graphics processing unit (GPU) 121, which processes the scaled and/or converted camera video 101 and game video 102 to generate the remote video output 124. Specifically, when SDR streaming is selected, the GPU 121 receives video from scaler 111 (which provides camera video 101 as SDR video) and converter 114 (which provides game video 102 as SDR video). The GPU 121 then combines the video from scaler 111 and converter 114 into remote video output 124, which is encoded for transmission via encoder 123. By contrast, when HDR streaming is selected, the GPU 121 receives video from converter 112 (which provides camera video 101 as HDR video) and scaler 113 (which provides game video 102 as HDR video). The GPU 121 then combines the video from converter 112 and scaler 113 into remote video output 124, which is encoded for transmission via encoder 123.

Additionally, the conversion components 100 include a blender 122, which blends the outputs of converter 115 and scaler 116 to generate the local video output 127. Specifically, the blender 122 receives video from converter 115 (which provides camera video 101 as HDR video) and scaler 116 (which provides game video 102 as HDR video). The blender 122 then combines the video from converter 115 and scaler 116 into local video output 127, which is provided to local display component 128. It is noted that the conversion components 100 may include any number of additional or alternative components not shown in FIG. 1. For example, for scenarios in which camera video is additionally or alternatively received from an HDR camera, the conversion components 100 may include one or more additional HDR-to-SDR converters to convert the camera video from HDR to SDR, such as to enable SDR streaming of the camera video to remote viewing device(s) 126. Moreover, in some examples, there may be no camera video provided from any cameras, and no camera video may be included in the remote video output 124 or the local video output 127.

Figure 2:
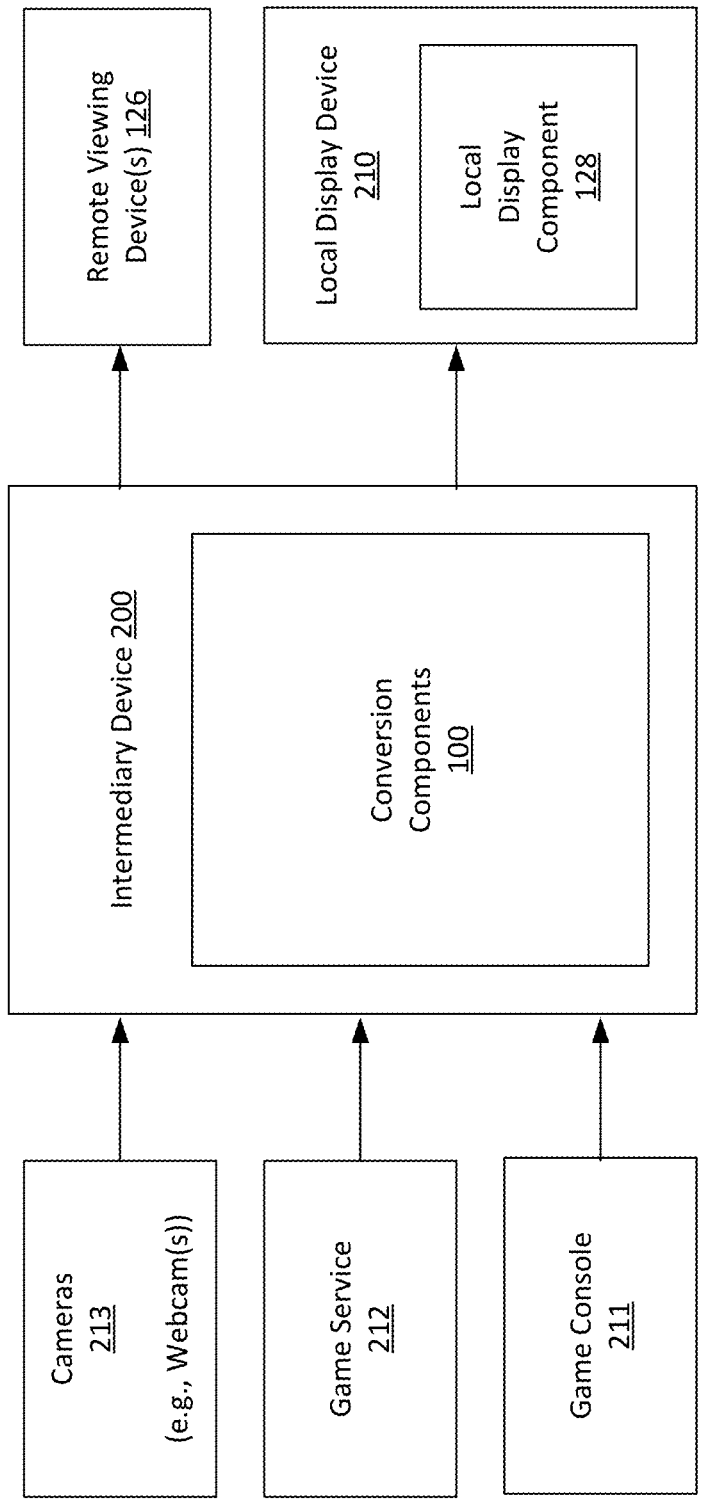
FIG. 2 is a diagram illustrating an example video game streaming system with intermediary video conversion that may be used in accordance with the present disclosure.

Referring now to FIG. 2, an example video game streaming system will now be described in detail. As shown in FIG. 2, the local display component 128 is included in a local display device 210 (e.g., smart television or other television). In the example of FIG. 2, the conversion components 100 are included in an intermediary device 200 that is separate from the local display device 210. In some examples, the game video 102 may be received, by the conversion components 100, from a game console 211, which may execute a video game that renders the game video. In some other examples, the game video 102 may be server-rendered game video that may be received, by the conversion components 100, from a game service 212. The game service 212 may include one or more remote servers, such as cloud-gaming servers, that execute the video game that renders the game video. The camera video 101 may be provided by a camera that is included in one or more camera(s) 213, such as one or more webcams. In some examples, the camera(s) 213 may include multiple HDR and/or SDR cameras that provide camera video to the conversion components 100. In some cases, the intermediary device 200 may include one or more HDMI™ or other digital video input ports, for example to receive video input from game console 211, camera(s) 213 and/or other devices. Additionally, the intermediary device 200 may include one or more HDMI™ or other digital video output ports, for example to provide video to local display device 210 and/or other devices. The intermediary device 200 may also include one or more wired and/or wireless network connections, such as to send and receive data to and from the Internet and other networks (e.g., to receive game video 101 from game service 212, to send remote video output to remote viewing device(s) 126, etc.). In one specific example, the intermediary device 200 may perform other television-related functionality, such as allowing downloading and executing of applications for watching movies, television programs, playing music, online shopping, and the like. In some examples, the intermediary device 200 may have a corresponding remote control, such as to allow users to make selections in a user interfaces that are provided by conversion components 100 and displayed on local display component 128. The intermediary device 200 may be a computing device that includes one or more processors and one or more memories, such as described below with reference to FIG. 13.

Figure 3:
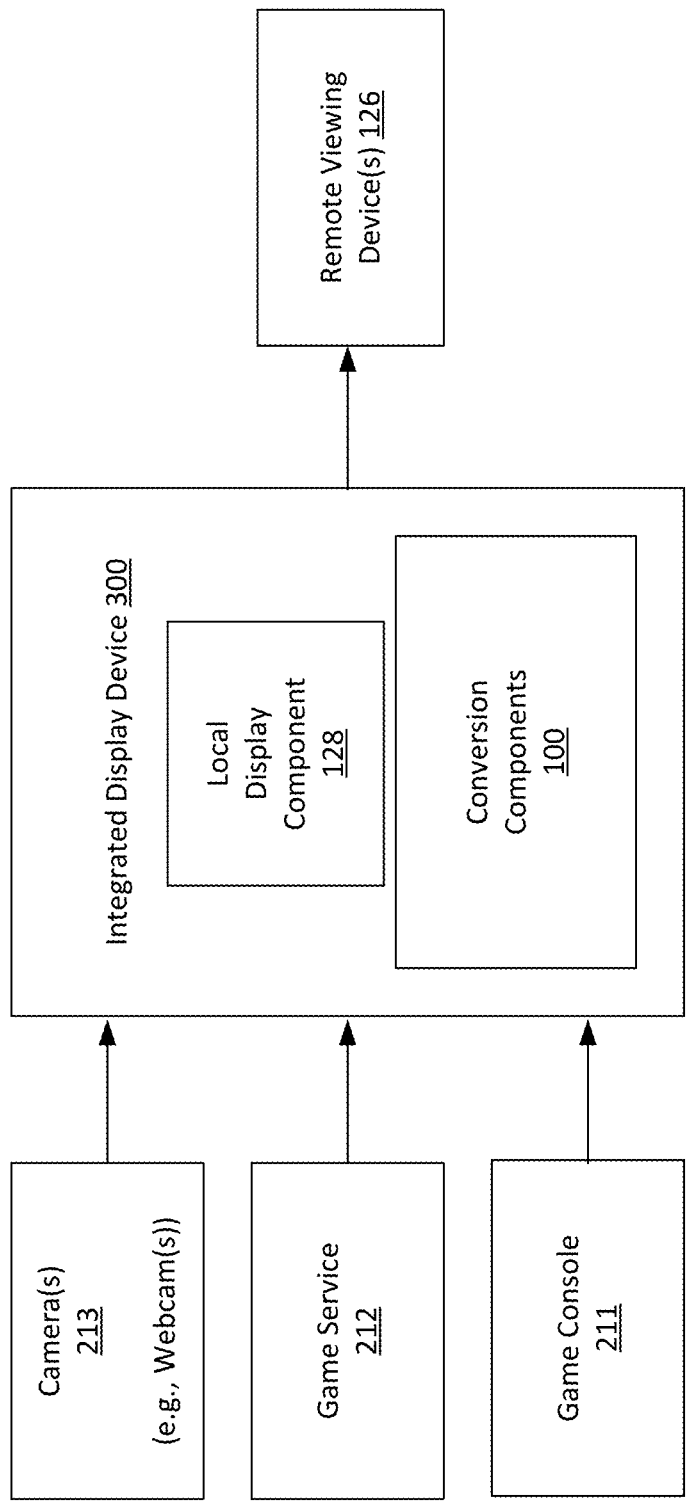
FIG. 3 is a diagram illustrating an example video game streaming system with display device-integrated video conversion that may be used in accordance with the present disclosure.

Referring now to FIG. 3, an alternative configuration of a video streaming system will now be described in detail. In the example, of FIG. 3, the conversion components 100 are integrated into an integrated display device 300 (e.g., a smart television) that includes the local display component 128. In some cases, the integrated display device 300 may include one or more HDMI™ or other digital video input ports, for example to receive video input from game console 211, camera(s) 213 and/or other devices. The integrated display device 300 may also include one or more wired and/or wireless network connections, such as to send and receive data to and from the Internet and other networks (e.g., to receive game video 102 from game service 212, to send remote video output to remote viewing device(s) 126, etc.). In some examples, the integrated display device 300 may have a corresponding remote control, such as to allow users to make selections in a user interfaces that are provided by conversion components 100 and displayed on local display component 128. The integrated display device 300 may be a computing device that includes one or more processors and one or more memories, such as described below with reference to FIG. 13.

One or more user interfaces provided by the conversion components 100 may allow the user to configure the arrangements for the remote video output 124 and the local video output 127. For example, the user interfaces may allow the user to select each video feed that is displayed in each of the remote video output 124 and in the local video output 127 as well as the respective size, shape (e.g., aspect ratio), and location of each video feed in each of the remote video output 124 and in the local video output 127. The user interfaces may also allow the user to dynamically (e.g., during gameplay) modify any, or all, of the configurations and selections for the local video output 127 and the remote video output 124. In some examples, the conversion components may include one or more additional GPU's (e.g., in addition to GPU 121), such as for rendering of the one or more user interfaces. The output of these additional GPU's may be provided directly, or indirectly, to blender 122.

Figure 4:
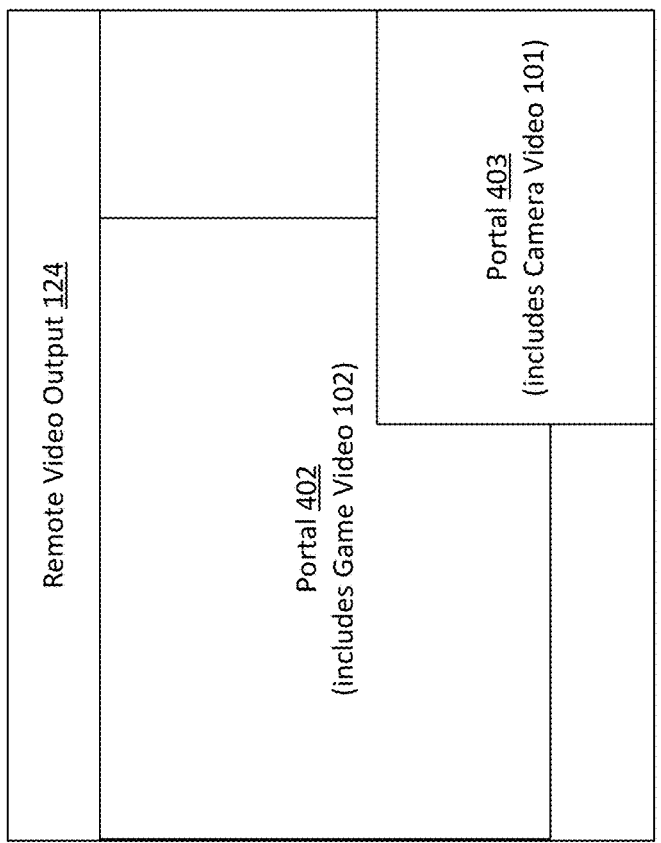
FIG. 4 is a diagram illustrating a first example video game streaming configuration that may be used in accordance with the present disclosure.
Figure 4:
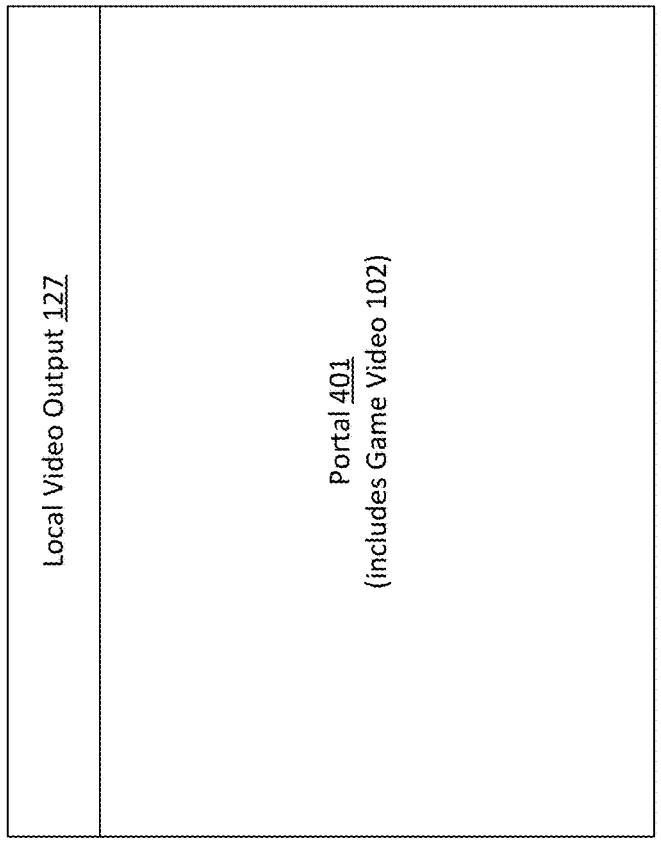

Referring back to FIG. 1, it is shown that the conversion components 100 include GPU 121, which allows processing of the remote video output 124 independently of the local video output 127. This may allow the remote video output 124 to be arranged differently than the local video output 127. For example, this may allow the remote video output to include video feeds that are not included in the local video output. Referring now to FIG. 4, an example is show in which a given video feed (i.e., camera video 101) is included in the remote video output 124 but not in the local video output 127. In particular, in the example of FIG. 4, the remote video output 124 includes a portal 402, which includes game video 102. Additionally, the remote video output 124 also includes a portal 403, which includes camera video 101. By contrast, the local video output 127 includes only portal 401, which includes the game video 102. Thus, in this example, the remote video output 124 includes both camera video 101 and game video 102, while the local video output 127 includes only game video 102. In some examples, the arrangement of FIG. 4 may be advantageous, such as because game players may not wish to view video of themselves in camera video 101 and would instead prefer to use the local display component 128 to view game video 102. It is noted that one or more features (e.g., resolution, dynamic range, etc.) of the game video 102 included in portal 401 may differ from one or more features (e.g., resolution, dynamic range, etc.) of the game video 102 included in portal 402. For example, in some cases, the game video 102 included in portal 401 may be HDR video, while the game video 102 included in portal 402 may be SDR video (e.g., for scenarios in which the user selects to stream video in SDR). Additionally, the resolution of game video 102 included in portal 401 may differ from the resolution of game video 102 included in portal 402.

In some examples, one or more video feeds may occupy a different display area in the remote video output 124 than in the local video output 127. For example, a video feed may have a different size and/or shape (e.g., aspect ratio) in the remote video output 124 than in the local video output 127. As a specific example, the camera video 101 may sometimes occupy a larger display area in the remote video output 124 than in the local video output 127. As another specific example, the camera video 101 may sometimes have a square shape in the remote video output 124 but may have a non-square rectangular shape in the local video output 127. As yet another specific example, the camera video 101 may be located at the bottom-right corner of the remote video output 124 but may be located at the top-left corner of the local video output 127.

The term display area refers to an area of the remote video output 124 or the local video output 127 that is occupied by a portal. For example, in FIG. 4, the display area of portal 402 in the remote video output 124 is the portion of the remote video output 124 that is occupied by portal 402 (i.e., the upper left portion of remote video output 124). By contrast, the display area of portal 401 in the local video output 127 is the portion of the remote video output 124 that is occupied by portal 402 (i.e., the upper left portion of remote video output 124). It is noted that both portals 401 and 402 include the same video feed (i.e., game video 102), albeit with potentially different dynamic ranges, resolutions, etc. Thus, in the example of FIG. 4, the game video 102 occupies a different display area in the remote video output 124 than in the local video output 127 (i.e., because portals 401 and 402 have different sizes, different shapes and occupy different respective locations of local video output 127 and remote video output 124). Generally, a video feed may occupy a different display area in the remote video output 124 than in the local video output 127 if the portals that include the video feed have a different size as one another, a different shape as one another, and/or different respective locations in the remote video output 124 and the local video output 127. By contrast, a video feed may occupy a same display area in the remote video output 124 and the local video output 127 if the portals that include the video feed have the same size as one another, the same shape as one another, and the same respective locations in the remote video output 124 and the local video output 127.

Figure 5:
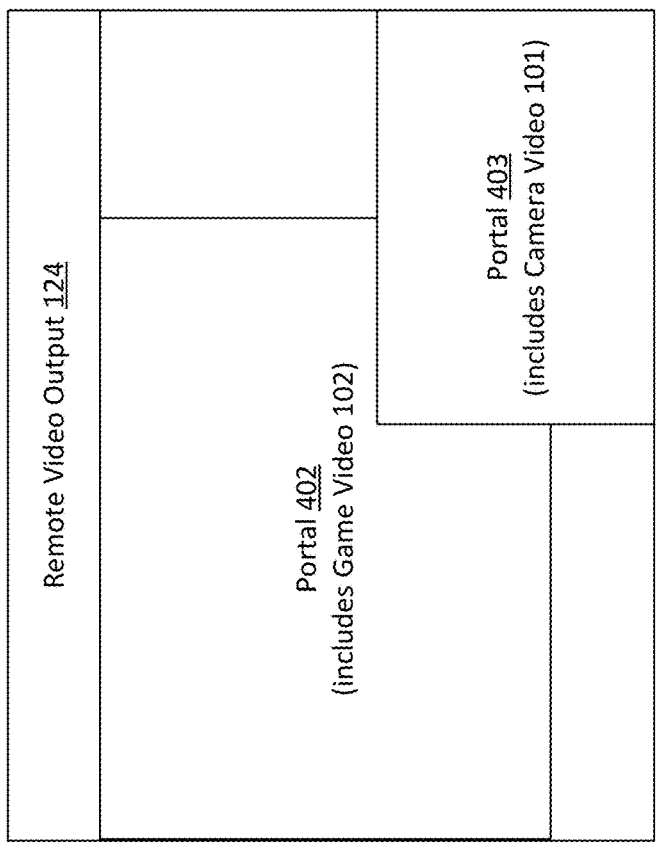
FIG. 5 is a diagram illustrating a second example video game streaming configuration that may be used in accordance with the present disclosure.
Figure 5:
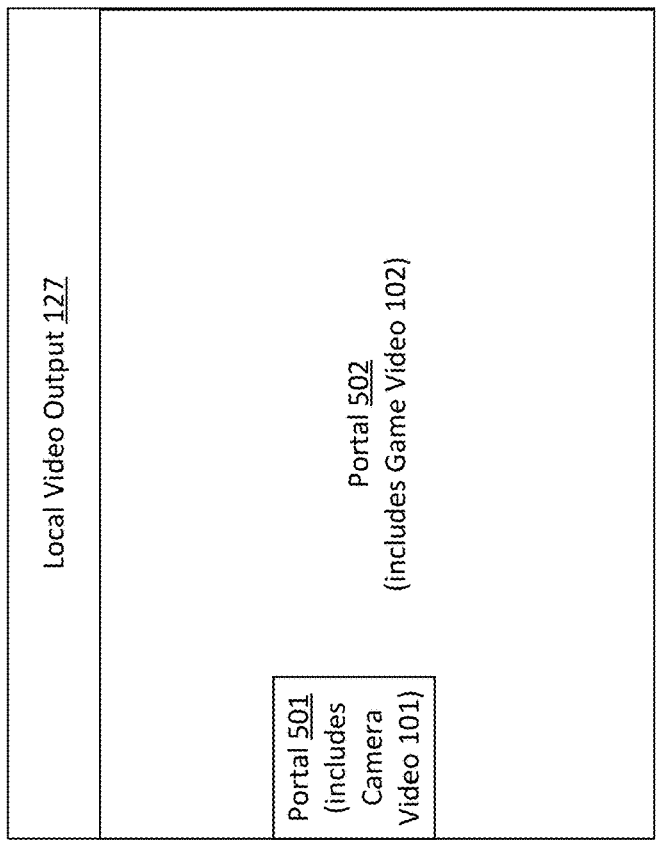

Referring now to FIG. 5, an example is shown in which both the camera video 101 and the game video 102 occupy different display areas in the remote video output 124 than in the local video output 127. In particular, in the example of FIG. 5, the remote video output 124 includes portal 402, which includes game video 102. Additionally, the local video output 127 includes portal 502, which also includes game video 102. However, the location of portal 402 in remote video output 124 differs from the location of portal 502 in local video output 127. Specifically, portal 402 occupies the top-left portion of remote video output 124. By contrast, portal 502 occupies all of local video output 127 with the exception of the portion overlayed by portal 501.

Additionally, portal 502 is larger than portal 402. Furthermore, portal 502 has a different shape (e.g., different aspect ratio) than portal 402. As also shown in FIG. 5, the remote video output 124 includes portal 403, which includes camera video 101. Additionally, the local video output 127 includes portal 501, which also includes camera video 101. However, the location of portal 403 in remote video output 124 differs from the location of portal 501 in local video output 127. Specifically, portal 403 occupies the bottom-right portion of remote video output 124. By contrast, portal 501 occupies the middle-left portion of local video output 127. Additionally, portal 403 is larger than portal 501. Furthermore, portal 403 has a different shape (e.g., different aspect ratio) than portal 501.

Figure 6:
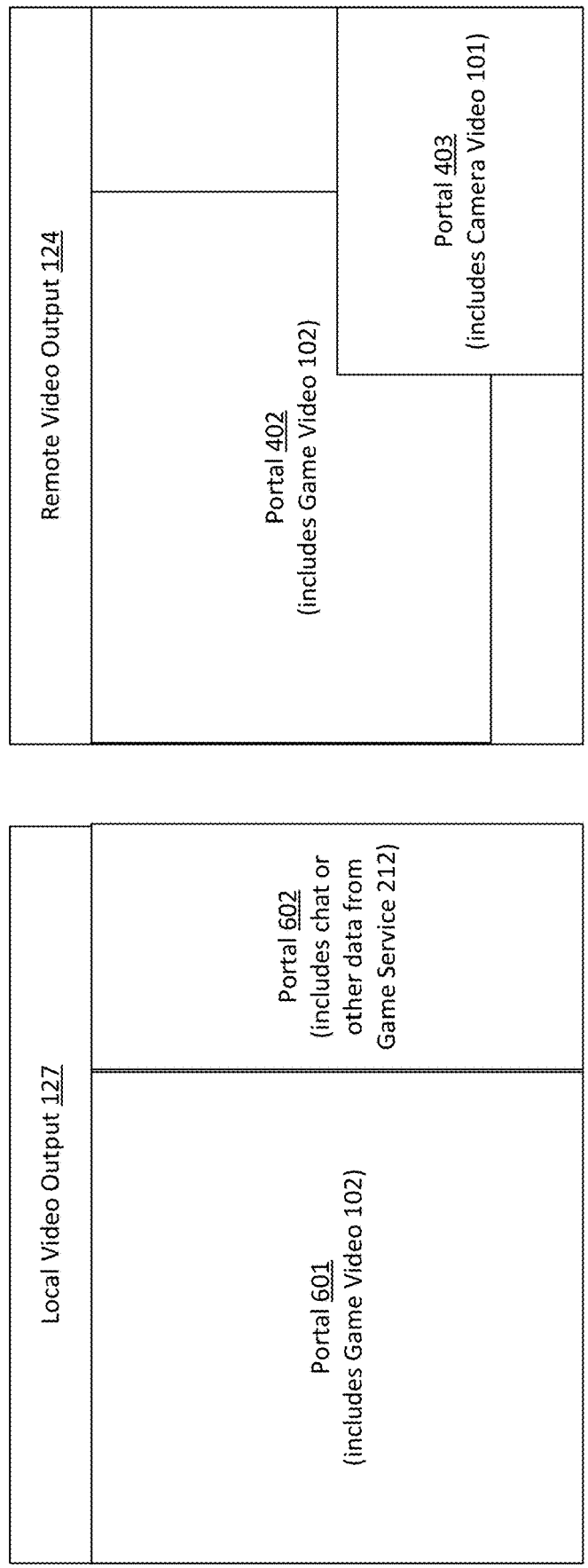
FIG. 6 is a diagram illustrating a third example video game streaming configuration that may be used in accordance with the present disclosure.

In some examples, the local video output 127 may include video feeds that are not included in the remote video output 124. For example, in some cases, an additional video input, such as a chat interface that displays chat messages associated with the video game, may be included in the local video output 127 but not in the remote video output 124. Referring now to FIG. 6, an example is shown in which the local video output 127 includes an additional video input that is not included in the remote video output 124. In particular, in the example of FIG. 6, the remote video output 124 again includes a portal 402, which includes game video 102, and portal 403, which includes camera video 101. By contrast, the local video output 127 includes portals 601 and 602. Portal 601 includes the game video 102. Additionally, portal 602 includes chat or other data received, by the conversion components 100, from game service 212. In one specific example, portal 602 may be a chat interface that displays chat messages associated with the video game that renders game video 102. Additionally, in some examples, the conversion components 100 may include one or more additional GPU's (e.g., in addition to GPU 121), such as for rendering of a chat interface (or other interface) that may be displayed in portal 602. The output of these additional GPU's may be provided directly, or indirectly, to blender 122.

Thus, FIGS. 4-6 depict some example scenarios in which the remote video output 124 may have a different arrangement than the local video output 127. In some other examples, however, it may be advantageous for the remote video output 124 to have the same arrangement as the local video output 127. In these scenarios, the conversion components 100 may provide the local video output 127 as an input that is used to generate the remote video output 124, thereby causing the remote video output 124 to have the same arrangement as the local video output 127 (albeit with potentially different dynamic range, resolution, etc.). Referring back to FIG. 1, it is shown that, for scenarios in which the remote video output 124 has the same arrangement as the local video output 127, the local video output 127 may be split and provided to both the local display component 128 and to an additional path 155. The local video output 127 may then be provided, via path 155, as an input to path 152. This means that, via path 152, the local video output 127 may be provided to either scaler 113 or converter 114, depending upon whether HDR streaming or SDR streaming is selected for remote video output 124. For scenarios in which SDR streaming is selected, it is necessary to convert the local video output 127 from HDR video to SDR video (for SDR streaming). Thus, when SDR streaming is selected, the local video output is provided, via path 152, to converter 114, which converts the local video output 127 from HDR video to SDR video. Converter 114 may also optionally scale the resolution of the local video output 127, if necessary, to match a desired transmission resolution. By contrast, for scenarios in which HDR streaming is selected, it is not necessary to convert the local video output 127 from HDR video to SDR video. Thus, when HDR streaming is selected, the local video output 127 is provided, via path 152, to scaler 113. Scaler 113 does not convert the local video output 127 from HDR video to SDR video. However, scaler 113 may optionally scale the resolution of the local video output 127, if necessary, to match a desired transmission resolution as described above. In this manner, the local video output 127 may be used to generate the remote video output 124, thereby causing the remote video output 124 to have the same arrangement as the local video output 127.

Figure 7:
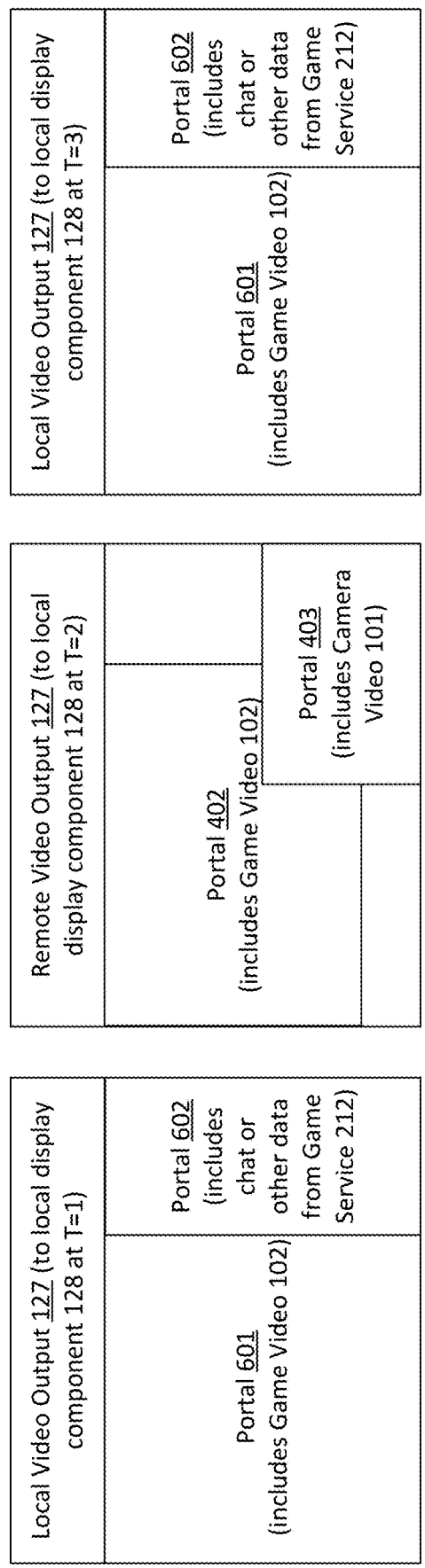
FIG. 7 is a diagram illustrating switching of input to a local display component that may be used in accordance with the present disclosure.

Furthermore, in some examples, when the remote video output 124 and the local video output 127 have different arrangements (e.g., as shown in FIGS. 4-6), the conversion components 100 may allow the remote video output 124 to be temporarily connected to the local display component 128, thereby allowing the user to temporarily view, on the local display component 128, the same output that is being seen by remote viewers. This may be helpful, such as to allow the user to temporarily see what his or her viewers are seeing. For example, the user may wish to confirm that the webcam feed in the remote video output is not blocking or certain portions of the game video. Thus, the conversion components may allow the user to switch the input to the local display between the local video output and the remote video output. Referring now to FIG. 7, an example is shown in which the video that is provided, by the conversion components 100, to the local display component 128 is switched between the local video output 127 and the remote video output 124. In particular, in the left portion of FIG. 7, it is shown that, at time T=1, the local video output 127 is provided to the local display component 128. In this example, the local video output 127 includes portal 601 (including game video 102) and portal 602 (including chat or other data from game service 212). As shown in the middle portion of FIG. 7, at time T=2 (which is a later time subsequent to time T=1), the video that is provided to the local display component 128 is switched from the local video output 127 to the remote video output 124. In this example, the remote video output 124 includes portal 402 (including game video 102) and portal 403 (including camera video 101). As shown in the right portion of FIG. 7, at time T=3 (which is a later time subsequent to time T=2), the video that is provided to the local display component 128 is switched back from the remote video output 124 to the local video output 127. In some examples, switching of the video that is provided to the local display component 128 between the local video output 127 and the remote video output 124 may be performed based one or more user commands. The conversion components 100 may optionally include a switching component, such as to perform switching between the local video output 127 and the remote video output 124. Both the local video output 127 and the remote video output 124 may be connected to the switching component, while the output of the switching component may be provided to the local display component 128.

The conversion components 100 may allow the user to switch the remote video output 124 (and/or the local video output 127) between different cameras. In one specific example, for most of the game transmission, the player may transmit video from a side-view camera that is zoomed-out to show not only the player's face but also the player's body, such as to show hand gestures and other player actions. However, at certain times during gameplay, such as right after key events (e.g., winning a battle, scoring a touchdown, etc.), the player may wish to temporarily transmit video from a front-view camera that is zoomed-in on the player's face, such as to show facial expressions in response to these key game events. The conversion components may allow the game player to switch between these multiple cameras with different camera angles, zoom levels, etc.

Figure 8:
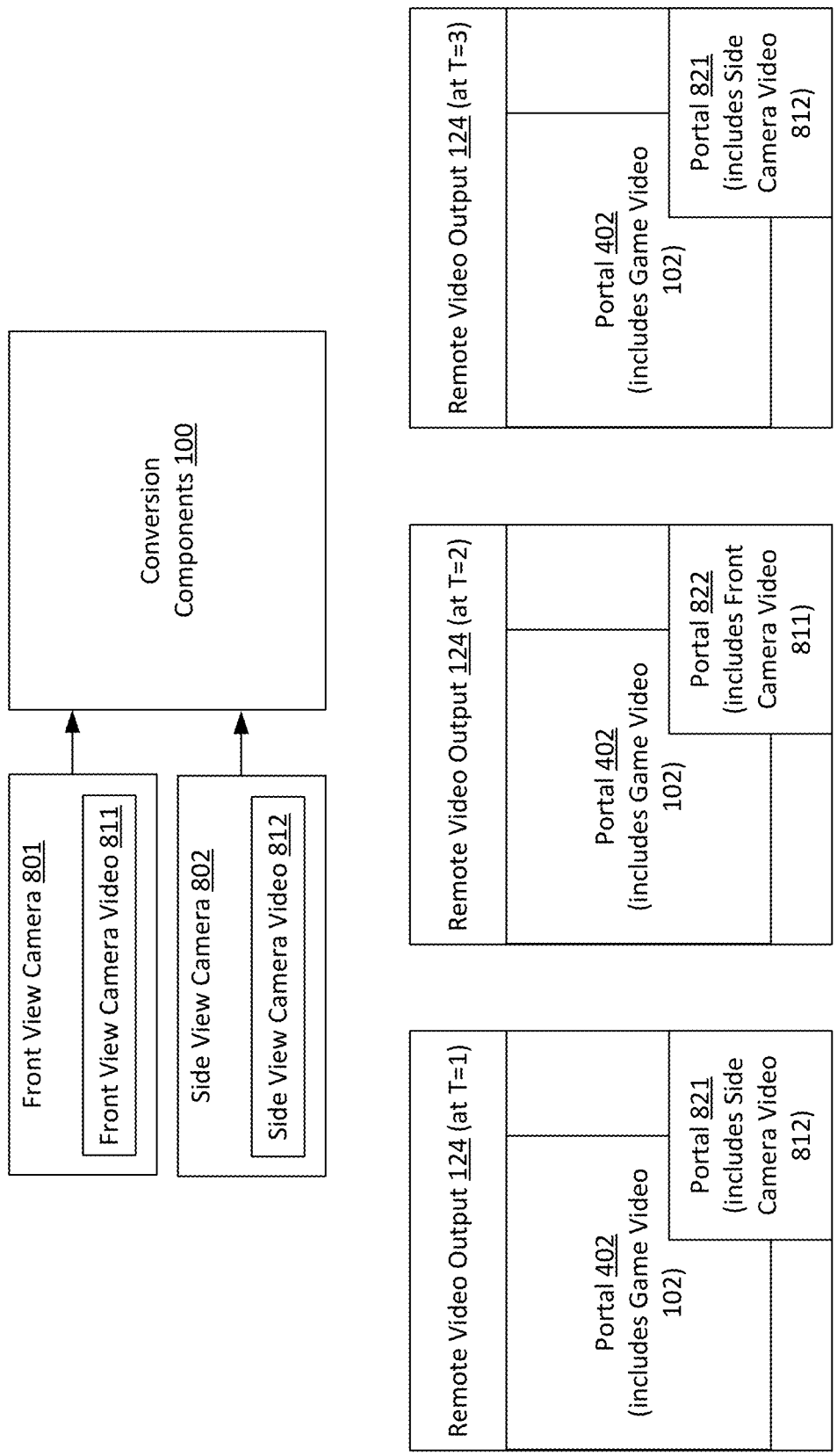
FIG. 8 is a diagram illustrating switching of camera views in remote video output that may be used in accordance with the present disclosure.

Referring now to FIG. 8, an example is shown in which the remote video output 124 is switched between a side view camera video 812 and a front view camera video 811. As shown at the top of FIG. 8, conversion components 100 may receive side view camera video 812 from side view camera 802. Conversion components 100 may also receive front view camera video 811 from front view camera 801. Side view camera 802 may be zoomed-out to show not only the player's face but also the player's body, such as to show hand gestures and other player actions. By contrast, front view camera 801 that may be zoomed-in on the player's face. As also shown in FIG. 8, at time T=1, remote video output includes portals 402 and 821. Portal 402 includes game video 102, while portal 821 includes side view camera video 812. Subsequently, at time T=2 (which is a later time subsequent to T=1), the remote video output is switched to have portal 822 replace portal 821. As shown, portal 822 includes front view camera video 811 as opposed to side view camera video 812. For example, time T=2 may occur right after a key video game event (e.g., winning a battle, scoring a touchdown, etc.), and the player may wish to temporarily transmit front view camera video 811 that is zoomed-in on the player's face, such as to show facial expressions in response to these key game events. Subsequently, at time T=3 (which is a later time subsequent to T=2), the remote video output is switched back to have portal 821 (which includes side view camera video 812) replace portal 822 (which includes front view camera video 811).

Figure 9:
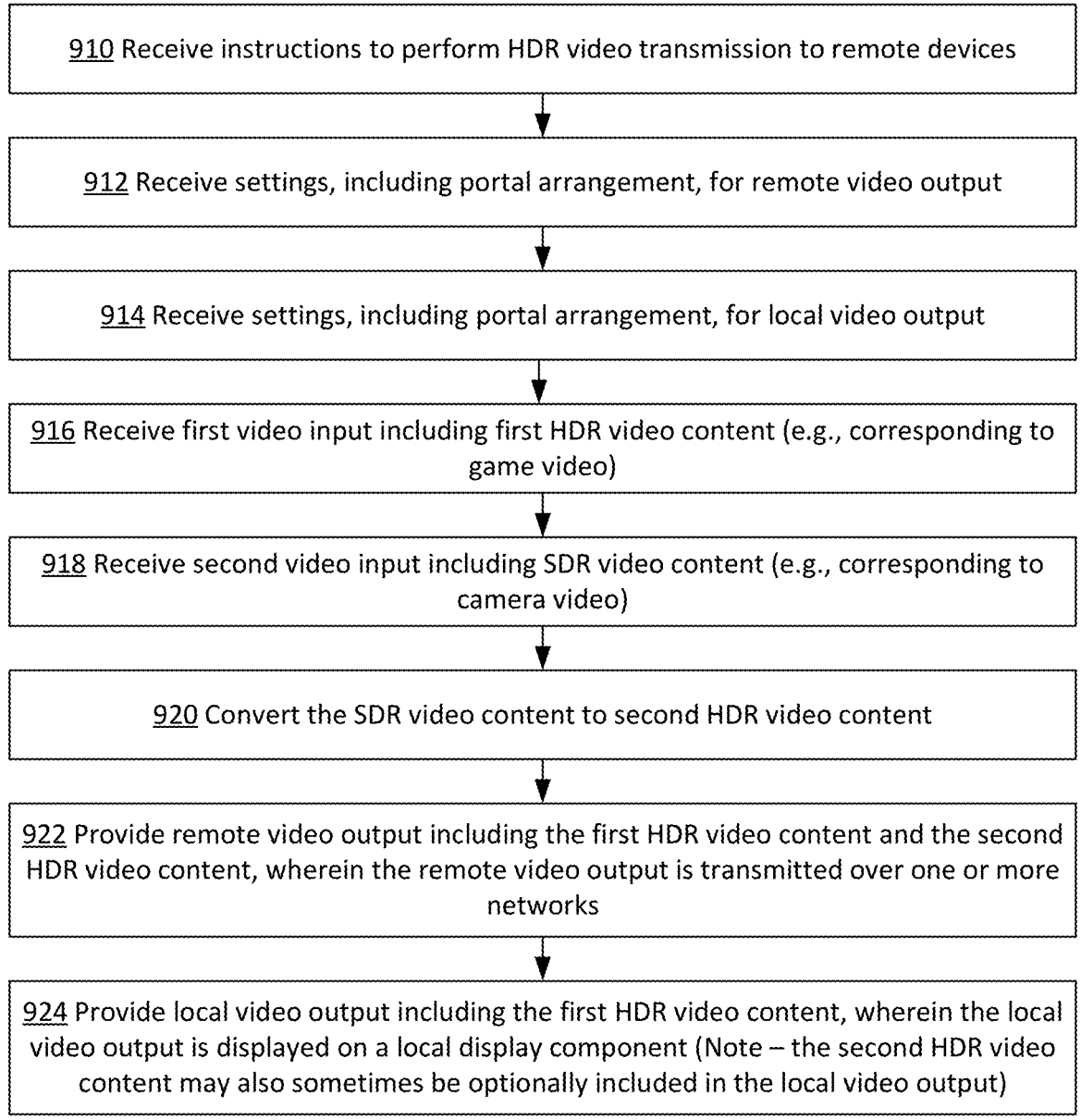
FIG. 9 is a flowchart illustrating an example video game streaming process with local HDR output and remote HDR output that may be used in accordance with the present disclosure.

FIG. 9 is a flowchart illustrating an example video game streaming process with local HDR output and remote HDR output that may be used in accordance with the present disclosure. In some examples, the process of FIG. 9 may be performed by the conversion components 100 (and, therefore, by a computing device that may include the conversion components 100, such as intermediary device 200 of FIG. 2 or integrated display device 300 of FIG. 3). Thus, in some examples, a computing device that performs the process of FIG. 9 may include the local display component or may be external to a display device that includes the local display component. As shown, the process of FIG. 9 is initiated at operation 910, at which instructions are received to perform HDR video transmission to remote devices. As described above, the conversion components 100 may allow either HDR or SDR video transmission to remote viewing device (s) 126. In some examples, the conversion components 100 may provide one or more user interfaces, which may be displayed via the local display component 128. The user interfaces provided by the conversion component may allow and/or assist the user in selecting (e.g., via a remote control of the intermediary device 200 of FIG. 2 and/or the integrated display device 300 of FIG. 3) either HDR or SDR video transmission to remote viewing device(s) 126. User selections may also be received through other inputs, e.g., voice command, etc. Thus, operation 910 may include receiving a user selection to perform HDR video transmission to remote devices.

At operation 912, settings, including portal arrangement, are received for the remote video output. In some examples, one or more of these settings may be selected by, and received from, a user, such as via one or more user interfaces that may be provided by the conversion components 100 and displayed on the local display component 128 (including via a remote control of the intermediary device 200 of FIG. 2 and/or the integrated display device 300 of FIG. 3 that makes selections in the user interface). The settings received at operation 912 include portal arrangement, such as the display area (e.g., size, shape, and location) of each portal within the remote video output. For example, indications may be provided of which video feeds are to be included in the remote video output, such as game video, camera video, and/or additional video feeds (e.g., chat interface, etc.). In some examples, each of the selected video feeds may have a respective portal that is included in the remote video output. In one specific example, a conversion component user interface may show an area that represents the remote video output and that includes a graphical representation of each portal in the remote video output. Each portal graphical representation may have sides that can be adjusted, such by dragging and dropping a side. This may allow re-sizing and re-shaping of the portals. Additionally, each portal graphical representation may be moved to a desired location in the area, such by dragging and dropping the portal graphical representation. This may allow the user to select the respective location of the portal within the remote video output. In this manner, the user interface may allow the user to select a respective display area (e.g., size, shape, and location) for each portal in the remote video output. Thus, in these and other examples, at least one user interface may be provided that allows a user to define a visual arrangement of one or more portals included in the remote video output. The settings received at operation 912 may also include a desired image resolution for the remote video output.

At operation 914, settings, including portal arrangement, are received for the local video output. In some examples, one or more of these settings may be selected by, and received from, a user, such as via one or more user interfaces that may be provided by the conversion components 100 and displayed on the local display component 128 (including via a remote control of the intermediary device 200 of FIG. 2 and/or the integrated display device 300 of FIG. 3 that makes selections in the user interface). The settings received at operation 914 include portal arrangement, such as the display area (e.g., size, shape, and location) of each portal within the remote video output. For example, indications may be provided of which video feeds are to be included in the local video output, such as game video, camera video, and/or additional video feeds (e.g., chat interface, etc.). In some examples, each of the selected video feeds may have a respective portal that is included in the local video output. In one specific example, a conversion component user interface may show an area that represents the local video output and the includes a graphical representation of each portal in the local video output. Each portal graphical representation may have sides that can be adjusted, such by dragging and dropping a side. This may allow re-sizing and re-shaping of the portals. Additionally, each portal graphical representation may be moved to a desired location in the area, such by dragging and dropping the portal graphical representation. This may allow the user to select the respective location of the portal within the local video output. In this manner, the user interface may allow the user to select a respective display area (e.g., size, shape, and location) for each portal in the remote video output. Thus, in these and other examples, at least one user interface may be provided that allows a user to define a visual arrangement of one or more portals included in the local video output. The settings received at operation 912 may also include a resolution of the local display component (which may be used as the image resolution for the local video output) as well as an indication to provide the local video output using HDR video.

At operation 916, first video input is received including first HDR video content. The first video input may be game video that is received from, and rendered by, a video game. Thus, the first HDR video content may be game video. For example, as shown in FIG. 1, game video 102 is received by the conversion components 100. The game video 102 may include HDR video upon being received by the conversion components 100 from the video game. At operation 918, second video input is received including SDR video content. The second video input may be camera video that is received from, and captured by, a camera. Thus, the SDR video content may be camera video. For example, as shown in FIG. 1, camera video 101 is received by the conversion components 100. The camera video 101 may include SDR video upon being received by the conversion components 100 from the camera.

At operation 920, the SDR video content is converted to second HDR video content. For example, as shown in FIG. 1, the camera video 101 may be provided, via path 151, to a converter 115, which converts the camera video 101 from SDR video to HDR video (and optionally scales the camera video 101) for transmission to remote viewing device(s) 126 via remote video output 124. As also shown in FIG. 1, the camera video 101 may be provided, via path 153, to converter 115, which converts the camera video 101 from SDR video to HDR video (and optionally scales the camera video 101) for display on the local display component 128 via local video output 127. Thus, in this example, operation 920 may include optionally either, or both, of the conversions of camera video 101 performed by converter 112 and/or by converter 115. Moreover, in this example, optionally either, or both, of the outputs of converter 112 and/or converter 115 may be considered to be second HDR video content, for example in the sense that providing video including either of those outputs may be considered to be providing video that includes the second HDR video content.

At operation 922, remote video output including the first HDR video content and the second HDR video content is provided, wherein the remote video output is transmitted over one or more networks. For example, as shown in FIG. 1, the conversion components 100 may provide remote video output 124. For scenarios in which HDR streaming is selected for the remote video output 124, the GPU 121 may combine the outputs of converter 112 and scaler 113 into the remote video output 124. Specifically, the first HDR video content may be included in the remote video output 124 via the output of scaler 113 (including game video 102 as HDR video optionally scaled for remote transmission). Additionally, the second HDR video content may be included in the remote video output 124 via the output of converter 112 (including the camera video 101 converted from SDR to HDR and optionally scaled for remote transmission).

At operation 924, local video output including the first HDR video content is provided, wherein the local video output is displayed on a local display component. For example, as shown in FIG. 1, the conversion components 100 may provide local video output 127. Specifically, the first HDR video content may be included in the local video output 127 via the output of scaler 116 (including game video 102 as HDR video optionally scaled for local display). Additionally, in some examples, the local video output 127 may sometimes optionally further include the second HDR video content, which may be included in the local video output 127 via the output of converter 115 (including the camera video 101 converted from SDR to HDR and optionally scaled for local display). As shown in the examples of FIGS. 4-6, the size, shape and/or location of the first HDR video (e.g., the game video 102) may be different in the remote video output than in the local video output. Additionally, the size, shape and/or location of the second HDR video (e.g., the camera video 101 converted from SDR to HDR) may be different in the remote video output than in the local video output.

Figure 10:
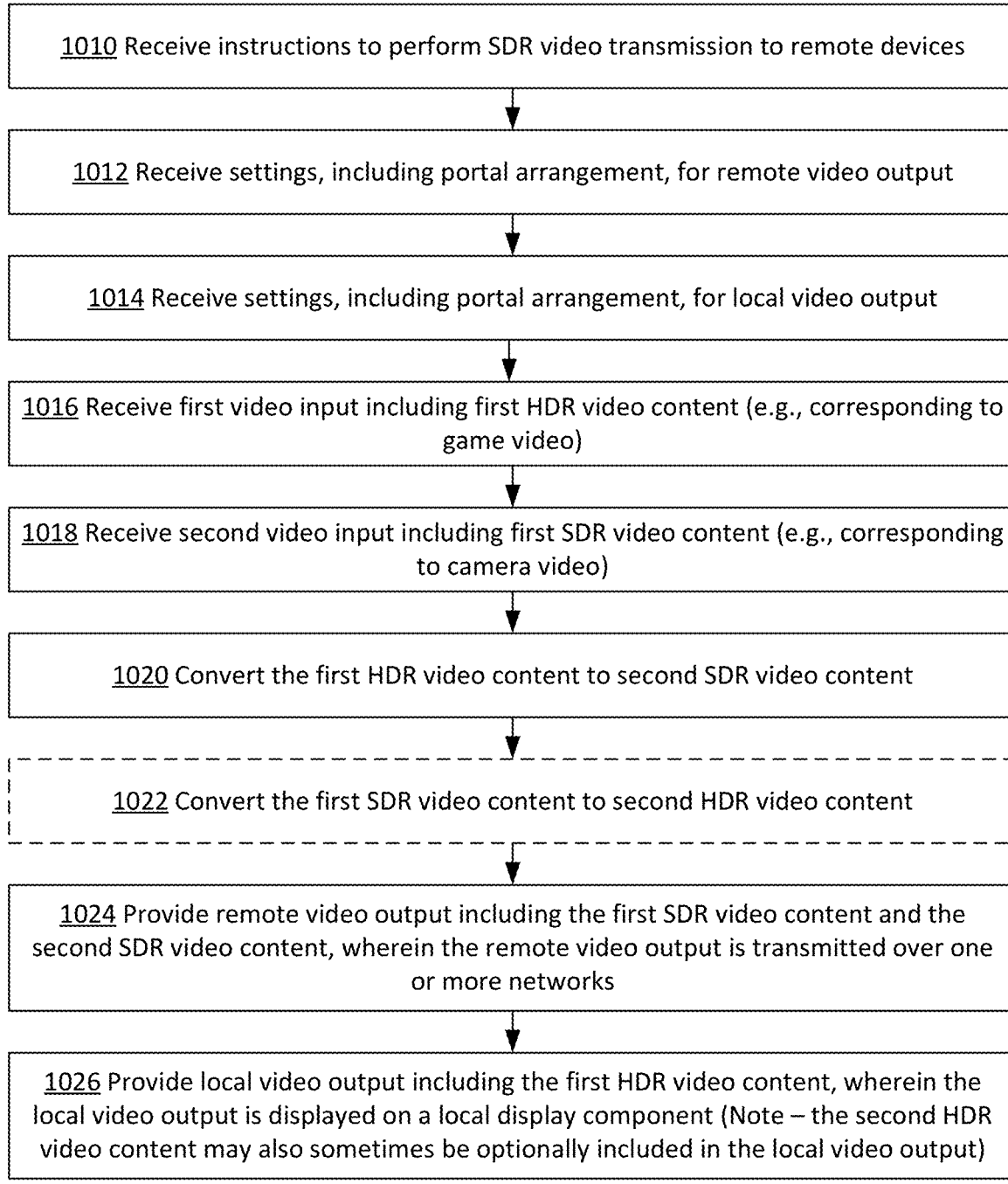
FIG. 10 is a flowchart illustrating an example video game streaming process with local HDR output and remote SDR output that may be used in accordance with the present disclosure.

FIG. 10 is a flowchart illustrating an example video game streaming process with local HDR output and remote SDR output that may be used in accordance with the present disclosure. In some examples, the process of FIG. 10 may be performed by the conversion components 100 (and, therefore, by a computing device that may include the conversion components 100, such as intermediary device 200 of FIG. 2 or integrated display device 300 of FIG. 3). Thus, in some examples, a computing device that performs the process of FIG. 10 may include the local display component or may be external to a display device that includes the local display component. As shown, the process of FIG. 10 is initiated at operation 1010, at which instructions are received to perform SDR video transmission to remote devices. As described above, the conversion components 100 may allow either HDR or SDR video transmission to remote viewing device(s) 126. In some examples, the conversion components 100 may provide one or more user interfaces, which may be displayed via the local display component 128. The user interfaces provided by the conversion component may allow and/or assist the user in selecting (e.g., via a remote control of the intermediary device 200 of FIG. 2 and/or the integrated display device 300 of FIG. 3) either HDR or SDR video transmission to remote viewing device(s) 126. User selections may also be received through other inputs, e.g., voice command, etc. Thus, operation 1010 may include receiving a user selection to perform SDR video transmission to remote devices.

At operation 1012, settings, including portal arrangement, are received for the remote video output. Operation 1012 may be the same as operation 912 of FIG. 9, and the description of operation 912 is therefore considered to apply to operation 1012 (without being repeated here). At operation 914, settings, including portal arrangement, are received for the local video output. Operation 1014 may be the same as operation 914 of FIG. 9, and the description of operation 914 is therefore considered to apply to operation 1014 (without being repeated here). At operation 1016, first video input is received including first HDR video content. Operation 1016 may be the same as operation 916 of FIG. 9, and the description of operation 916 is therefore considered to apply to operation 1016 (without being repeated here). At operation 1018, second video input is received including first SDR video content. Operation 1018 may be the same as operation 918 of FIG. 9, and the description of operation 918 is therefore considered to apply to operation 1018 (without being repeated here).

At operation 1020, the first HDR video content is converted to second SDR video content. For example, as shown in FIG. 1, the game video 102 may be provided, via path 152, to a converter 114, which converts the game video 102 from HDR video to SDR video (and optionally scales the game video 102) for transmission to remote viewing device (s) 126 via remote video output 124.

At operation 1022, the first SDR video content is converted to second HDR video content. For example, as shown in FIG. 1, the camera video 101 may be provided, via path 153, to converter 115, which converts the camera video 101 from SDR video to HDR video (and optionally scales the camera video 101) for display on the local display component 128 via local video output 127.

At operation 1024, remote video output including the first SDR video content and the second SDR video content is provided, wherein the remote video output is transmitted over one or more networks. For example, as shown in FIG. 1, the conversion components 100 may provide remote video output 124. For scenarios in which SDR streaming is selected for the remote video output 124, the GPU 121 may combine the outputs of scaler 111 and converter 114 into the remote video output 124. Specifically, the first SDR video content may be included in the remote video output 124 via the output of scaler 111 (including camera video 101 as SDR video optionally scaled for remote transmission). Additionally, the second SDR video content may be included in the remote video output 124 via the output of converter 114 (including the game video 102 converted from HDR to SDR and optionally scaled for remote transmission).

At operation 1026, local video output including the first HDR video content provided, wherein the local video output is displayed on a local display component. For example, as shown in FIG. 1, the conversion components 100 may provide local video output 127. Specifically, the first HDR video content may be included in the local video output 127 via the output of scaler 116 (including game video 102 as HDR video optionally scaled for local display). Additionally, in some examples, the local video output 127 may sometimes optionally further include the second HDR video content, which may be included in the local video output 127 via the output of converter 115 (including the camera video 101 converted from SDR to HDR and optionally scaled for local display).

Figure 11:
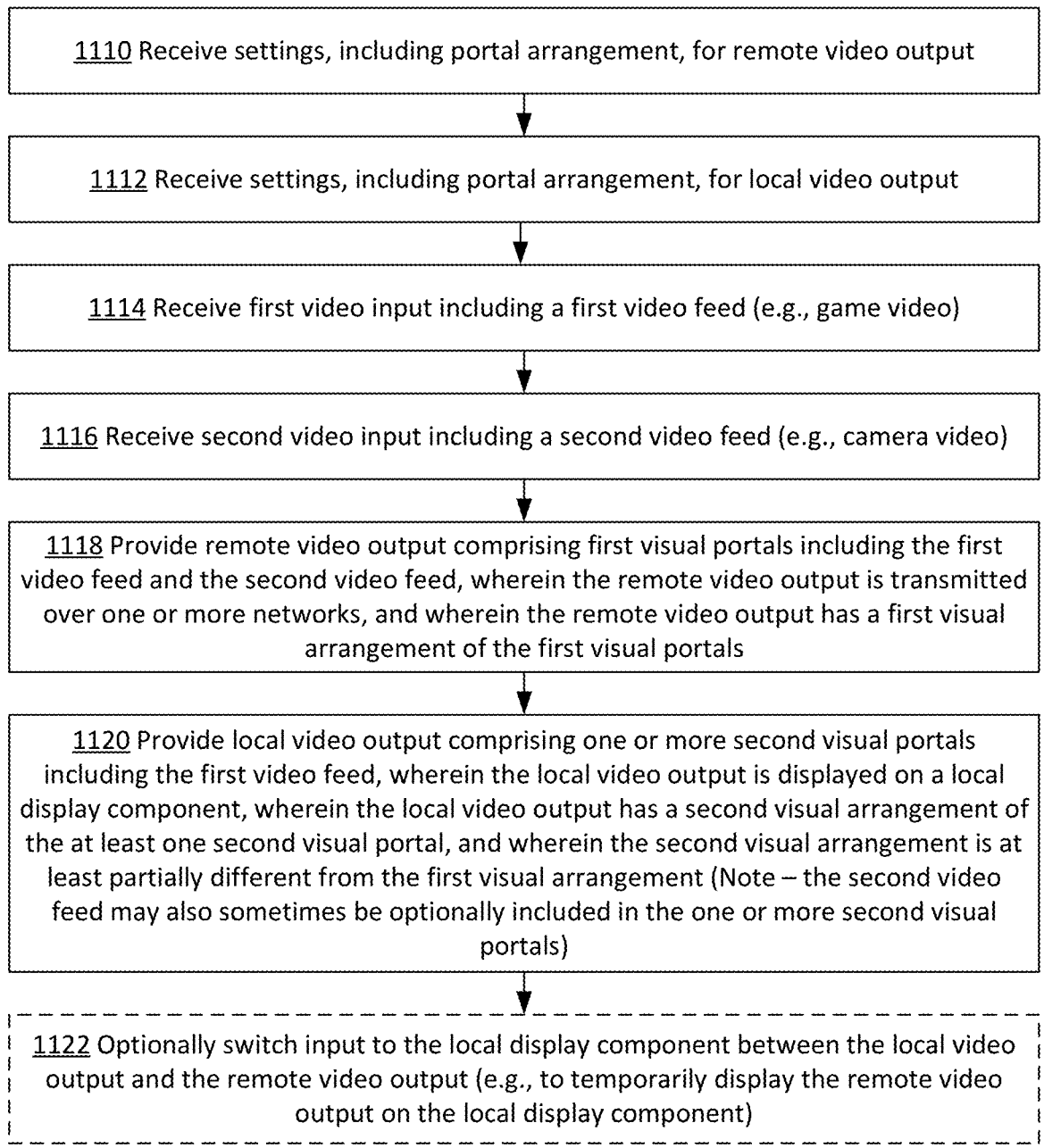
FIG. 11 is a flowchart illustrating an example video game streaming process with local and remote outputs having different respective portal arrangements that may be used in accordance with the present disclosure.

FIG. 11 is a flowchart illustrating an example video game streaming process with local and remote outputs having different respective portal arrangements that may be used in accordance with the present disclosure. In some examples, the process of FIG. 11 may be performed by the conversion components 100 (and, therefore, by a computing device that may include the conversion components 100, such as intermediary device 200 of FIG. 2 or integrated display device 300 of FIG. 3). Thus, in some examples, a computing device that performs the process of FIG. 11 may include the local display component or may be external to a display device that includes the local display component. As shown, the process of FIG. 11 is initiated at operation 1110, at which settings, including portal arrangement, are received for the remote video output. Operation 1110 may be the same as operation 912 of FIG. 9, and the description of operation 912 is therefore considered to apply to operation 1110 (without being repeated here). At operation 1112, settings, including portal arrangement, are received for the local video output. Operation 1112 may be the same as operation 914 of FIG. 9, and the description of operation 914 is therefore considered to apply to operation 1112 (without being repeated here).

At operation 1114, a first video input including a first video feed is received. The first video feed may be received from, and rendered by, a video game. Thus, the first video feed may be a game video feed. For example, as shown in FIG. 1, game video 102 is received by the conversion components 100. At operation 1116, second video input is received including a second video feed. The second video feed may be received from, and captured by, a camera. Thus, the second video feed may be a camera video feed. For example, as shown in FIG. 1, camera video 101 is received by the conversion components 100. It is noted that the term video feed, as used herein, refers to video irrespective of modifiable features such as dynamic range, resolution, etc. Thus, for example, a game video feed may that is converted from HDR to SDR is still considered to be the same video feed both before and after its HDR to SDR conversion. As another example, a camera video feed may that is converted from SDR to HDR is still considered to be the same video feed both before and after its SDR to HDR conversion.

At operation 1116, the remote video output comprising first visual portals including the first video feed and the second video feed is provided, wherein the remote video output is transmitted over one or more networks, and wherein the remote video output has a first visual arrangement of the first visual portals. For example, as shown in FIG. 1, the remote video output 124 is provided by the conversion components 100 for transmission over network(s) 125 to remote viewing device(s) 126. As described above, at least one user interface may be provided that allows a user to define the first visual arrangement (i.e., the portal arrangement for the remote video output) and/or a second visual arrangement (i.e., the portal arrangement for the local video output). For example, operation 916 describes some examples of how portal arrangement may be defined, such as by a user, for the remote video output, such as by selecting a size, shape (e.g., aspect ratio) and/or location of each portal included in the remote video output. This description is not repeated here.

At operation 1118, local video output comprising one or more second visual portals including the first video feed is provided, wherein the local video output is displayed on a local display component, wherein the local video output has a second visual arrangement of the one or more second visual portals, and wherein the second visual arrangement is at least partially different from the first visual arrangement. For example, as shown in FIG. 1, the local video output 127 is provided by the conversion components 100 to local display component 128. As described above, at least one user interface may be provided that allows a user to define the first visual arrangement (i.e., the portal arrangement for the remote video output) and/or the second visual arrangement (i.e., the portal arrangement for the local video output). For example, operation 918 describes some examples of how portal arrangement may be defined, such as by a user, for the local video output, such as by selecting a size, shape (e.g., aspect ratio) and/or location of each portal included in the remote video output. This description is not repeated here. It is noted that the second video feed may also sometimes be optionally included in the one or more second visual portals.

It is noted that FIGS. 4-6 show some examples in which the first visual arrangement is at least partially different from the second visual arrangement. In some examples, the second visual arrangement may differ from the first visual arrangement at least because the second video feed is not included in the one or more second visual portals. For example, as shown in FIG. 4, the remote video output 124 includes portal 402 (including game video 102) and portal 403 (including camera video 101). By contrast, the local video output 127 includes only portal 401 (including game video 102) and no portal including camera video 101.

Additionally, in some examples, the second visual arrangement may differ from the first visual arrangement at least because the first video feed occupies at least a partially different display area in the second visual arrangement than in the first visual arrangement. This means that the first video feed has a different size, different shape (e.g., aspect ratio) and/or occupies at least partially different respective locations of the remote video output 124 and the local video output 127. FIG. 5 illustrates an example in which all three of these conditions (e.g., different size, different shape, and at least partially different respective locations of the remote video output 124 and the local video output 127) are met. For example, as shown in FIG. 5, portal 402 (which includes game video 102) and portal 502 (which includes game video 102) occupy at least partially different respective locations of remote video output 124 and local video output 127. Specifically, portal 402 occupies the top-left portion of remote video output 124. By contrast, portal 502 occupies all of local video output 127 with the exception of the portion overlayed by portal 501. Additionally, portal 502 is larger than portal 402. Furthermore, portal 502 has a different shape (e.g., different aspect ratio) than portal 402.

Furthermore, in some examples, the second visual arrangement may differ from the first visual arrangement at least because the one or more second visual portals may include a third video feed that is not included in the first visual portals. For example, as shown in FIG. 6, the local video output 127 includes portal 601 (including game video 102) and portal 602, which includes an additional video feed (i.e., chat or other data from game service 212). By contrast, in FIG. 6, the remote video output 124 does not include a portal that includes chat or other data from game service 212. Rather, remote video output instead includes portal 402 (including game video 102) and portal 403 (including camera video 101).

At operation 1122, input to the local display component is optionally switched between the remote video output and the local video output. For example, as shown in FIG. 7, input to the local display component 128 may be switched between the remote video output 124 and the local video output 127. This may allow the user to temporarily view, on the local display, the same output that is being seen by remote viewers. This may be helpful, such as to allow the user to temporarily see what his or her viewers are seeing. For example, the user may wish to confirm that the webcam feed in the remote video output is not blocking certain portions of the game video. It is, therefore, noted that the feature that the local video output is displayed on a local display component, for example as specified in operations 1120, 1026 and 924, does not require that the local video output must be displayed on the local display component for an entire duration of the local video output (e.g., an entire duration that a game is being played). Rather, the local video output need only be displayed on the local display component for at least some viewable time period in order to satisfy this feature, for example such as to allow switching of the input to the local display component between the local video output and the remote video output.

As described above, in some examples, the second video feed may be received from a first camera. For example, referring back to FIG. 8, the second video feed may be side view camera video 812 received from side view camera 802. In some examples, the remote video output may be switched between the second video feed and an additional video feed received from an additional camera. For example, as show in FIG. 8, the remote video output 124 may be switched between side view camera video 812 and front view camera video 811 (received from front view camera 801). This may allow a view to be temporarily switched to the additional view feed, such as to quickly show a player's reaction to a key game event. It is, therefore, noted that the feature that the remote video output comprises first visual portals including the first video feed and the second video feed, for example as specified in operation 1118, does not require that a visual portal including the second feed must be included in the remote video output for an entire duration of the remote video output (e.g., an entire duration that game video is being transmitted to remote viewers). Rather, a visual portal including the second feed need only be included in the remote video output for at least some viewable time period in order to satisfy this feature, for example such as to allow switching of the remote video output between the second video feed and an additional video feed received from an additional camera.

Figure 12:
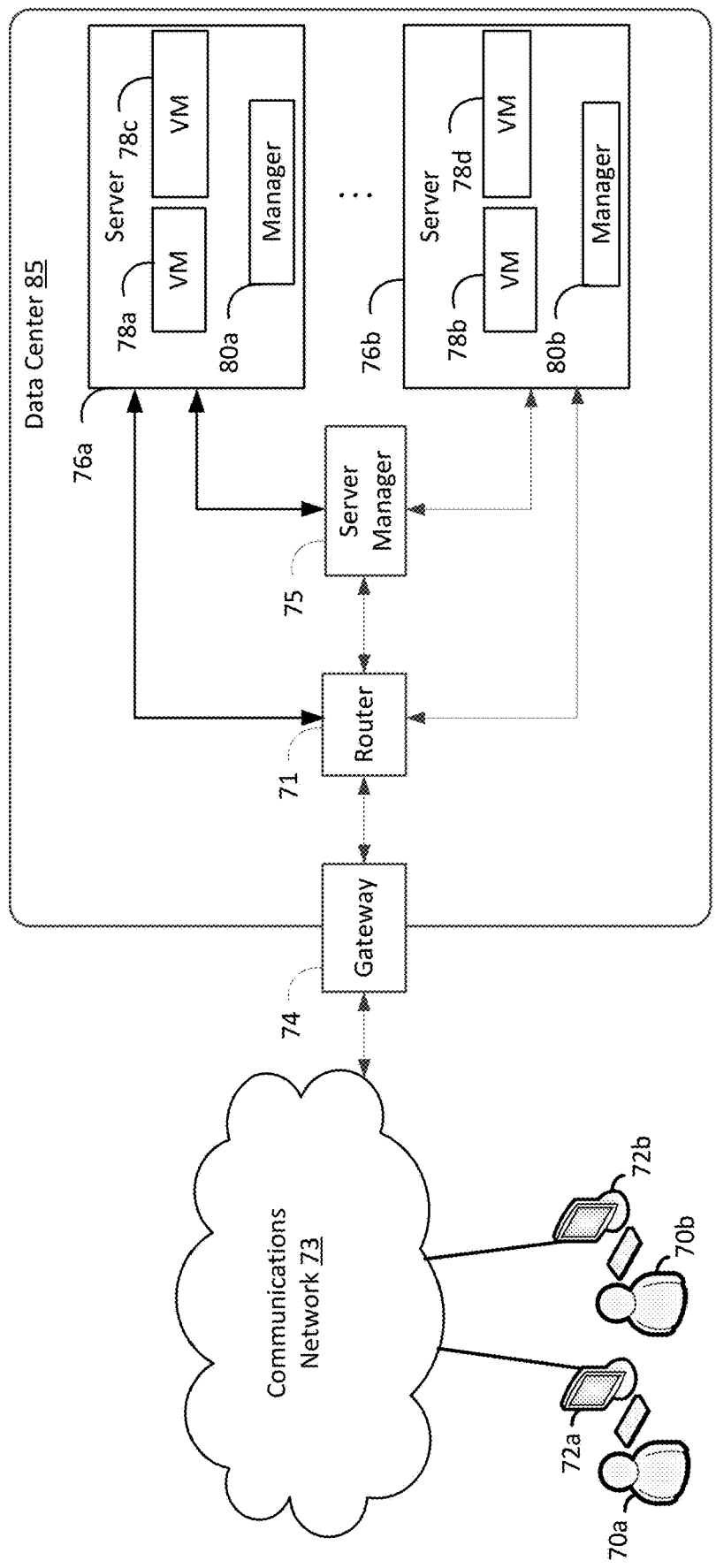
FIG. 12 is a diagram illustrating an example system for transmitting and providing data that may be used in accordance with the present disclosure.

An example system for transmitting and providing data will now be described in detail. In particular, FIG. 12 illustrates an example computing environment in which the embodiments described herein may be implemented. FIG. 12 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 12, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 12 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 12, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 12, a server manager 75 is also employed to at least in part direct various communications to, from and/or between servers 76*a* and 76*b*. While FIG. 12 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 12 has been greatly simplified and that many more networks and networking devices may be utilized to interconnect the various computing systems disclosed herein. These network topologies and devices should be apparent to those skilled in the art.

It should also be appreciated that data center 85 described in FIG. 12 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 13:
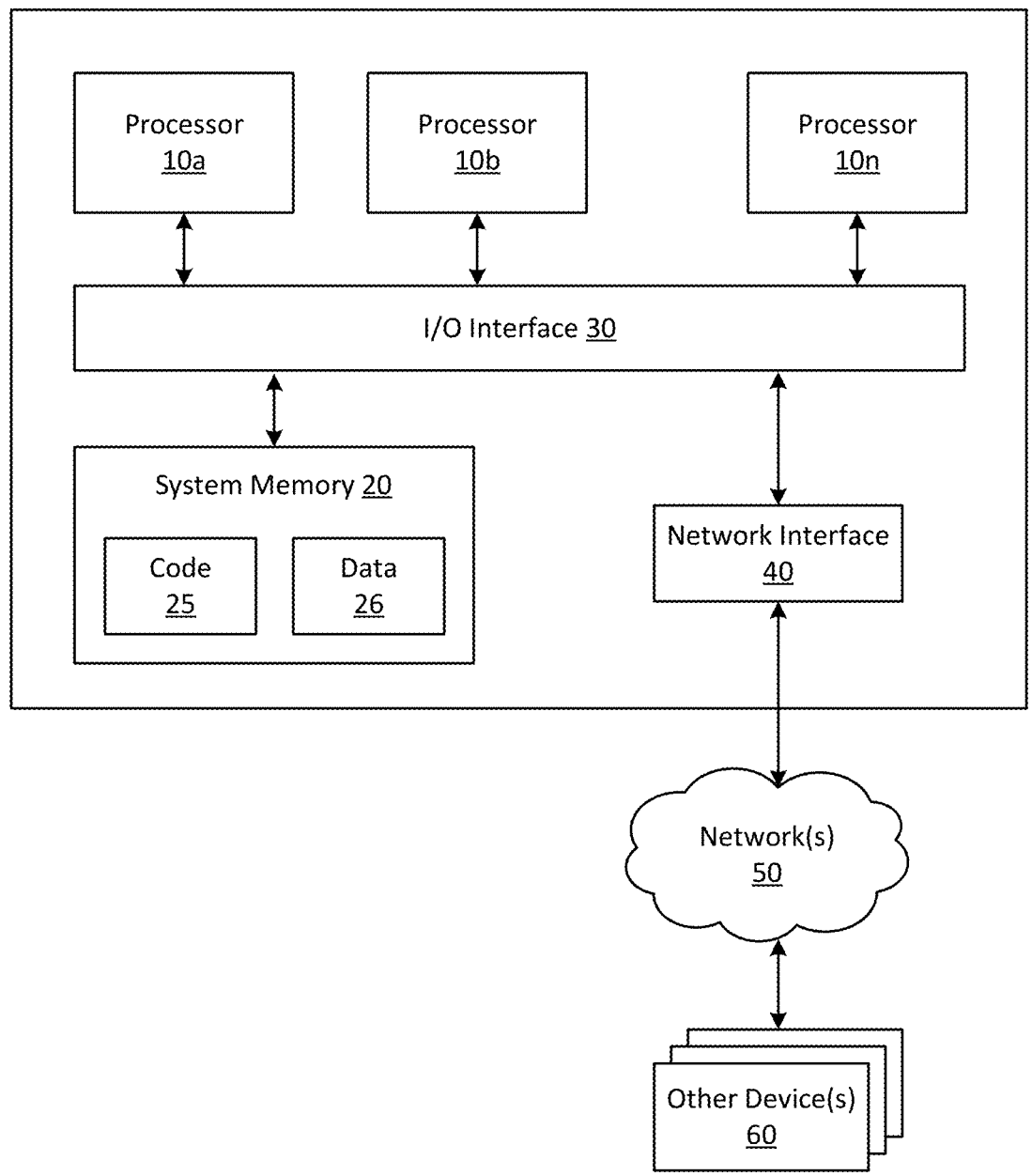
FIG. 13 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 13 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing device comprising:
   one or more processors; and
   one or more memories having stored thereon instructions that, when executed by the one or more processors, cause the computing device to perform operations comprising:
   receiving a user selection to perform high-dynamic-range (HDR) video transmission;
   receiving, from a video game, game video including first high-dynamic-range (HDR) video content;
   receiving, from a camera, camera video including standard-dynamic-range (SDR) video content;
   converting the SDR video content to second HDR video content;
   providing remote video output including the first HDR video content from the game video and the second HDR video content converted from the SDR video content in the camera video, wherein the remote video output is transmitted over one or more networks; and
   providing local video output including the first HDR video content, wherein the local video output is displayed on a local display component.

2. The computing device of claim 1, further comprising the local display component.

3. The computing device of claim 1, wherein the computing device is external to a display device that includes the local display component.

4. The computing device of claim 1, wherein the local video output further includes the second HDR video content.

5. A computer-implemented method comprising:
receiving, from a video game, game video including first high-dynamic-range (HDR) video content;
receiving, from a camera, camera video including standard-dynamic-range (SDR) video content;
converting the SDR video content to second HDR video content;
providing remote video output including the first HDR video content from the game video and the second HDR video content converted from the SDR video content in the camera video, wherein the remote video output is transmitted over one or more networks; and
providing local video output including the first HDR video content, wherein the local video output is displayed on a local display component.

6. The computer-implemented method of claim 5, wherein the computer-implemented method is performed by a computing device that comprises the local display component.

7. The computer-implemented method of claim 5, wherein the computer-implemented method is performed by a computing device that is external to a display device that includes the local display component.

8. The computer-implemented method of claim 5, further comprising receiving a user selection to perform HDR video transmission.

9. The computer-implemented method of claim 5, wherein the local video output further includes the second HDR video content.

10. The computer-implemented method of claim 5, wherein at least one of a size, shape or location of the first HDR video content is different in the remote video output than in the local video output.

11. One or more non-transitory computer-readable storage media having stored thereon computing instructions that, upon execution by a computing device, cause the computing device to perform operations comprising:
receiving, from a video game, game video including first high-dynamic-range (HDR) video content;
receiving, from a camera, camera video including standard-dynamic-range (SDR) video content;
converting the SDR video content to second HDR video content;
providing remote video output including the first HDR video content from the game video and the second HDR video content converted from the SDR video content in the camera video, wherein the remote video output is transmitted over one or more networks; and
providing local video output including the first HDR video content, wherein the local video output is displayed on a local display component.

12. The one or more non-transitory computer-readable storage media of claim 11, wherein the computing device comprises the local display component.

13. The one or more non-transitory computer-readable storage media of claim 11, wherein the computing device is external to a display device that includes the local display component.

14. The one or more non-transitory computer-readable storage media of claim 11, wherein the operations further comprise receiving a user selection to perform HDR video transmission.

15. The one or more non-transitory computer-readable storage media of claim 11, wherein the local video output further includes the second HDR video content.

16. The one or more non-transitory computer-readable storage media of claim 11, wherein at least one of a size, shape or location of the first HDR video content is different in the remote video output than in the local video output.

* * * * *